(12) United States Patent
Jong et al.

(10) Patent No.: US 10,574,503 B1
(45) Date of Patent: Feb. 25, 2020

(54) EFFICIENT CYCLIC PREFIX GENERATION WITH HALF TONE OFFSET

(71) Applicant: Hughes Network Systems, LLC, Germantown, MD (US)

(72) Inventors: James Jehong Jong, North Potomac, MD (US); Channasandra Ravishankar, Clarksburg, MD (US); Billy James Whitmarsh, San Diego, CA (US)

(73) Assignee: Hughes Network Systems, LLC, Germantown, MD (US)

( * ) Notice: Subject to any disclaimer, the term of this patent is extended or adjusted under 35 U.S.C. 154(b) by 0 days.

(21) Appl. No.: 16/236,003

(22) Filed: Dec. 28, 2018

(51) Int. Cl.
*H04L 27/26* (2006.01)

(52) U.S. Cl.
CPC ...... *H04L 27/2678* (2013.01); *H04L 27/2602* (2013.01); *H04L 27/2628* (2013.01); *H04L 27/2636* (2013.01)

(58) Field of Classification Search
CPC ............ H04L 27/2678; H04L 27/2602; H04L 27/2636; H04L 27/2628
See application file for complete search history.

(56) References Cited

U.S. PATENT DOCUMENTS

| | | | |
|---|---|---|---|
| 2006/0176966 A1* | 8/2006 | Stewart | H04L 27/2607 375/260 |
| 2010/0189132 A1* | 7/2010 | Fettweis | H04L 5/003 370/480 |
| 2013/0219431 A1* | 8/2013 | Hong | H04H 20/42 725/54 |
| 2013/0315320 A1* | 11/2013 | McGowan | H04L 27/2614 375/260 |
| 2018/0026750 A1* | 1/2018 | Kravtsov | H04L 1/0643 375/267 |
| 2018/0091267 A1* | 3/2018 | Kim | H04L 27/26 |
| 2018/0123842 A1* | 5/2018 | Lopez | H04J 11/003 |

* cited by examiner

*Primary Examiner* — Jean B Corrielus

(74) *Attorney, Agent, or Firm* — Kilpatrick Townsend & Stockton

(57) ABSTRACT

Half tone offset may be utilized to mitigate signal distortion caused by DC bias within OFDM-based systems. In addition a cyclic prefix may be utilized within an OFDM-based system to mitigate inter-symbol-interference. Presented herein are techniques and methods to efficiently apply a cyclic prefix to an OFDM symbol with half tone offset for low power systems.

20 Claims, 5 Drawing Sheets

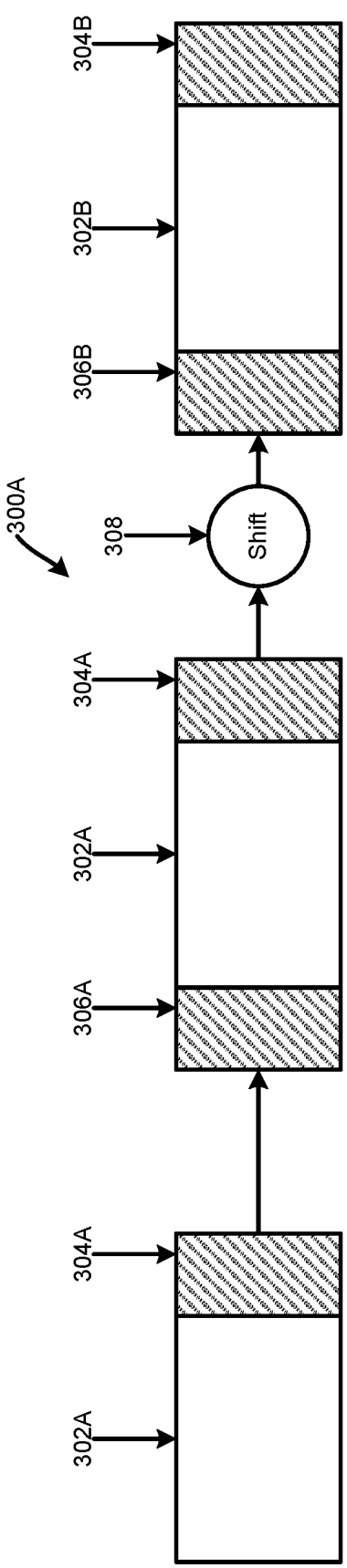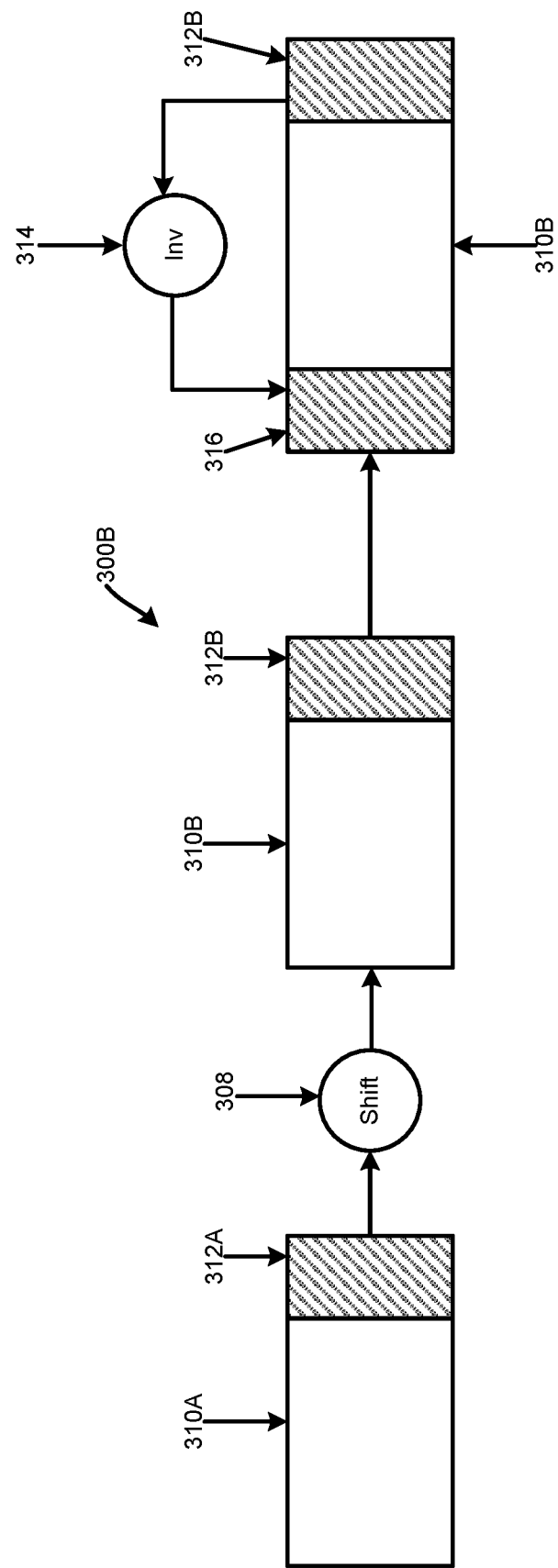
FIG. 3A
FIG. 3B

EFFICIENT CYCLIC PREFIX GENERATION WITH HALF TONE OFFSET

BACKGROUND

Orthogonal frequency division multiplexing (OFDM) is a widely used method of encoding data utilizing multiple frequencies. Several other communication systems and techniques are based on the principals of OFDM such as, Long Term Evolution (LTE), Orthogonal Frequency Division Multiple Access (OFDMA), Single Carrier Frequency Division Multiple Access (SC-FDMA, also known as Discrete Fourier Transform (DFT) Spread OFDM), Narrowband Internet of Things (NB-IoT), and $5^{th}$ generation (5G) cellular mobile communications. Although OFDM has remained widely popular, its efficiency is hindered within direct conversion (i.e., zero IF) by direct current (DC) bias due to local oscillator (LO) leakage. A half tone offset (shift) was introduced to minimize the DC bias. However, implementation of the half tone offset greatly increases computational requirements and processes of transceivers implementing OFDM with half tone offset. Thus, there is a need, within signal processing technology, to reduce the computational burden of applying a half tone offset within OFDM and OFDM-based systems.

BRIEF SUMMARY

Systems, methods, and techniques provided herein generally relate to efficient cyclic prefix generation with half tone offset within OFDM-based systems. In one embodiment, a method is provided comprising receiving a symbol waveform associated with one or more subcarriers. In some embodiments, each subcarrier of the one or more subcarriers is associated with a first frequency. The method may further comprise identifying a last portion of the symbol waveform. The method may further comprise modifying, by applying a half tone offset, a second frequency associated with symbol waveform to generate a frequency shifted symbol waveform. The method may further comprise, in response to generating the frequency shifted symbol waveform, inverting a sign of the last portion of the symbol waveform to generate an inverted portion. The method may further comprise prepending the inverted portion to the frequency shifted symbol waveform to generate an output signal. The method may further comprise transmitting, to a receiving device, the output signal.

In some embodiments, the method may further comprise generating, based at least in part on an Inverse Fast Fourier Transform, the symbol waveform.

In some embodiments, the second frequency is a center frequency of the symbol waveform. In some embodiments, the symbol waveform comprises a sample length of x and the last portion comprises a sample length of y, wherein x is a positive integer and y is a positive integer that is less than x. In one embodiment, the output signal comprises a sample length of x and the inverted portion comprises a sample lengthy, wherein the inverted portion is prepended to the sample portion length of x and x is a positive integer and y is a positive integer that is less than x.

In some embodiments, the symbol waveform is an orthogonal frequency division multiplexing symbol waveform or a single carrier frequency divisional multiple access symbol waveform. In some embodiments, wherein the receiving device is a sensor within a narrow band Internet of Things system.

BRIEF DESCRIPTION OF THE FIGURES

Features, embodiments, and advantages of the present disclosure are better understood when the following Detailed Description is read with reference to the accompanying drawings.

FIG. 3A depicts an example first implementation of a cyclic prefix within an OFDM-based system in accordance with one or more embodiments.

FIG. 3B depicts an example second implementation of a cyclic prefix within OFDM-based system in accordance with one or more embodiments.

DETAILED DESCRIPTION

Figure 1:
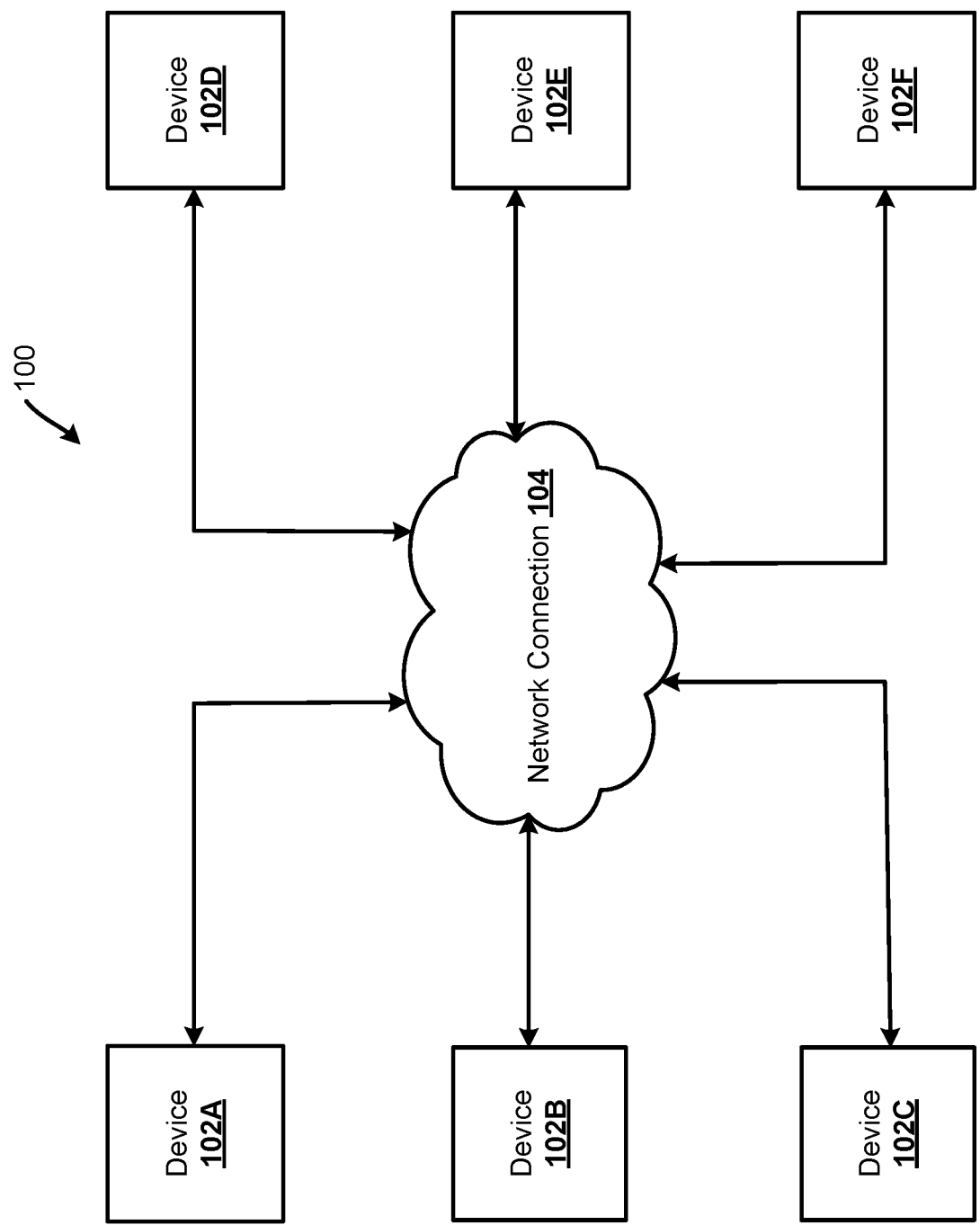
FIG. 1 illustrates an example network in accordance with one or more embodiments.

In the following description, for the purposes of explanation, specific details are set forth in order to provide a thorough understanding of certain inventive embodiments. However, it will be apparent that various embodiments may be practiced without these specific details. The figures and description are not intended to be restrictive. The word "exemplary" is used herein to mean "serving as an example, instance, or illustration". Any embodiment or design described herein as "exemplary" is not necessarily to be construed as preferred or advantageous over other embodiments or designs.

The present disclosure generally relates to techniques for improving the efficiency of OFDM-based systems. More specifically, the present disclosure discloses techniques for efficient generation of cyclic prefixes in OFDM-based systems that implement a half tone offset. OFDM-based systems may be any system that utilizes the concepts of OFDM (e.g., LTE, OFDMA, SC-FDMA, NB-IoT, 5G cellular mobile communications, and the like). OFDM-based systems may utilize a plurality of subcarriers (e.g. carrier waves) to transmit data. In addition, many OFDM-based systems may use a direct conversion architecture. However, although direct conversions offers low cost and low power consumption as compared to traditional super heterodyne architectures, direct conversion also introduces DC bias due to LO leakage. This DC bias may introduce noise and distort a center subcarrier within an OFDM-based system. As a result, unsuppressed DC bias may significantly distort OFDM signals and increase symbol error rate (SER) within OFDM-based systems. To counter issues arising from DC bias, OFDM-based systems may implement a half tone offset (i.e. half of a carrier spacing) to minimize the DC bias effect and allow full use of all subcarriers (i.e. DC subcarrier) for data transmission.

Another issue that may arise in OFDM-based systems is inter-symbol-interference (ISI). ISI may occur when a symbol affects another symbol due to a multi-channel path. In OFDM-based systems, multiple bits may be transmitted in a single symbol in parallel over multiple subcarriers. As symbols are transmitted to a receiver, the path from transmitter to receiver may introduce a delay spread in the time domain. This delay may result in one or more symbols being spread out (e.g., by multi-path fading) and may cause interfere with other symbols, which causes ISI. ISI may be mitigated by prepending a cyclic prefix (CP) onto each symbol. To implement a CP, after a symbol is formed, a last portion of the symbol may be copied and then prepended to the symbol. In one embodiment, the length of the CP may vary and be longer than a delay spread associated with a communication path (e.g., the path between a transmitter and receiver) in order to reduce ISI.

In a first type OFDM-based systems, the CP is prepended to a symbol and then the half tone offset is applied to the symbol. Application of a half tone offset may require complex operations (e.g., multiplications and additions) to modify the center carrier frequency of the symbol. Application of a half tone offset may be computationally expensive and the expense is proportional to the size of the CP. For example, suppose there is a symbol with that comprises of N samples with N being the number of subcarriers in an OFDM-based system. The CP may be a fraction or percentage of the N samples, such as, 7.25%. As a result, the symbol with CP is now 7.25% larger and the half tone offset is then applied to this larger symbol. However, according to one or more embodiments within this disclosure, the computational complexities with including a CP may be reduced and thus computational expenses associated with CP may be reduced.

A different method for implementing CP in OFDM-based systems may include receiving a symbol comprising of N samples and instead of initially generating a CP of the symbol, the half tone offset is applied to the symbol to generate a half tone frequency shifted symbol without a CP. Next, the CP is generated by copying a fraction or percentage of the half tone frequency shifted symbol. Then the CP is inverted and prepended to the half tone frequency shifted symbol. As a result, the complex processes required to apply the half tone offset are performed on a symbol comprising N samples instead of a symbol comprising N samples and a CP. This change in processing may reduce the computational complexity involved with implementing both CP for ISI reduction and half tone offset for signal distortion reduction.

FIG. 1 depicts a simplified network 100 for implementing one or more embodiments. Network 100 comprises devices 102A-102F coupled to each other via network connection 104. Network 100 may be a NB-IoT network, an LTE network, or any other network where devices are coupled to each other via a network connection. Devices 102A-102F may be implemented as mobile devices, cellular phones, smart phones, sensors affixed to machinery, base stations, satellites, televisions, smart televisions, speakers, smart speakers, wearables, appliances (e.g., washer, refrigerator, oven, etc.), meters, security systems, smart city technologies (e.g., devices that monitor traffic and weather conditions), thermostats, lighting devices (e.g., light bulbs), vehicles (e.g., cars, trucks, etc.), commercial vehicles, and the like. In one embodiment, devices 102A-102F may be implemented by different devices. For example device, 102A may be a smart phone and device 102B may be a smart TV. In one embodiment, devices 102A-102F may be part of an ecosystem. For example, device 102A may be a sensor at a first light within a smart city, device 102B may be a sensor at a second light within the smart city, device 102C may be a sensor associated with a first autonomous vehicle within the smart city, device 102D may be a sensor associated with a second autonomous vehicle within the smart city, and device 102E may be a processing device, such as a microprocessor or FPGA, that controls a cross walk signal within the smart city. In one embodiment, one or more of devices 102A-102F may be low power devices. For example, many different types of sensors may be low power devices. In such an example, devices 102A-102F may be low power sensors associated with a supply chain or manufacturing process where each one of devices 102A-102F is associated with a different aspect or process within a supply chain or manufacturing process.

Devices 102A-102F may comprise one or more processors and non-volatile memory resources. The processor(s) may include single, multicore processors, application specific integrated circuits (ASIC). The processor(s) may include general purpose microprocessors such as ones provided by Intel®, AMD®, ARM®, Freescale Semiconductor, Inc., and the like, that operate under the control of software stored in associated memory. The non-volatile memory resources may store one or more programs that may be executed by the processor(s) to implement one or more embodiments described. In one embodiment, the processor(s) may be a part of a modulator within a transmitting device.

Network connection 104 may facilitate communications between devices 102A-102F. Network connection 104 may be one implemented by various network types and can include, for example, the Internet, a wide area network (WAN), a local area network (LAN), an Ethernet network, a public or private network, a wired network, a wireless network, and the like, and combinations thereof. Network connection 104 may also be implemented via one or more low power networks, such as, low power wide area network (LPWAN). Network connection 104 may utilize different communication protocols that may be used to facilitate the communications including both wired and wireless protocols such as IEEE 802.XX suite of protocols, TCP/IP, IPX, SAN, Bluetooth®, Low power Bluetooth®, Zigbee, Zwave, Chirp spread spectrum based protocols, Ultra-narrow band based protocols, such as, NB-Fi, and other protocols.

Figure 2:
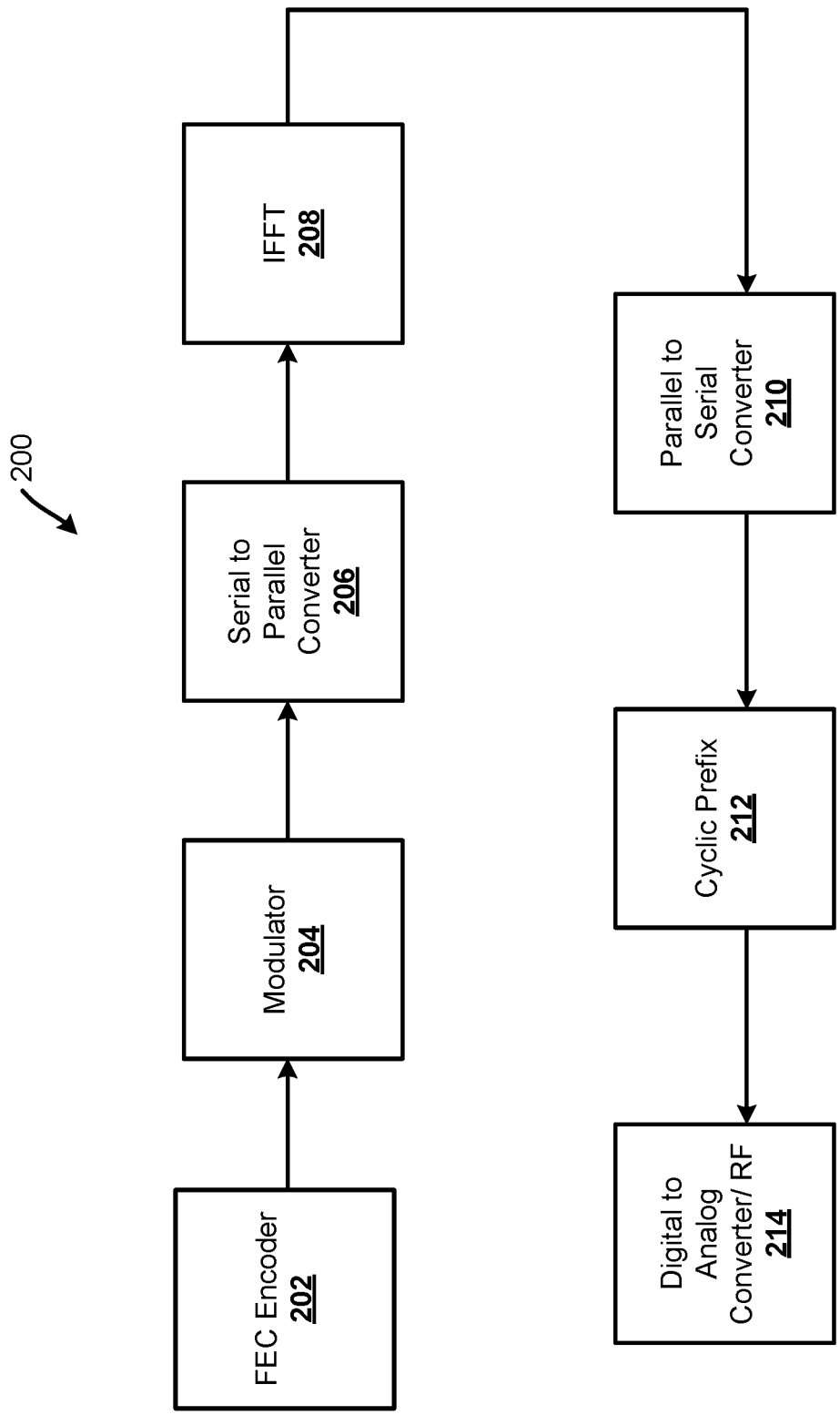
FIG. 2 illustrates an example block diagram of an OFDM-based system in accordance with one or more embodiments.

FIG. 2 depicts a simplified OFDM-based transmitter block diagram 200. OFDM-based transmitter block diagram 200 may comprise processes implemented by a transmitter of data. A transmitter of data may be one or more devices communicatively coupled to another device that is configured to receive transmitted data. For example, a transmitter of data may be a base station associated with a cellular network, a satellite, a mobile device, a smart phone, a device end for a return link, and the like. OFDM-based transmitter block diagram 200 comprises forward error correction (FEC) encoder 202, modulator 204, serial to parallel converter 206, inverse fast Fourier transform (IFFT) 208, parallel to serial converter 210, cyclic prefix 212, and digital to analog converter/RF converter 214. Each component of OFDM-based transmitter block diagram 200 may be implemented by a hardware component capable of performing one or more operations associated with that component. For example, FEC encoder 202 may be implemented by a processor capable of performing FEC encoding. In one embodiment, each component of OFDM-based transmitter block diagram 200 may be implemented by a software component capable of performing one or more operations associated with that component. For example, IFFT 208, may be implemented by software stored in computer-readable memory and when the software is executed by a processor, causes the processor to perform an inverse fast Fourier transformation on one or more datasets.

FEC encoder 202 receives digital data (in the form of bits) and encodes redundancy data into the digital data. The digital data may be received by one or more data sources. A data source may be a mobile device, a sensor, a content provider, and the like. The digital data may be video data, audio data, sensor data, bit streams, and the like. By introducing redundancy data into the received digital data the digital data may contain error correcting code. The redundancy data allows a receiver of data to detect a number of errors that may occur without requiring the retransmission of data.

Modulator 204 may be a digital modulation process for converting digital data (received from FEC encoder 202) into symbols using one or more modulation schemes, such as, quadrature phase shift keying (QPSK), quadrature amplitude modulator (QAM), binary phase shift keying (BPSK), and the like, and/or any combination of one or more modulation schemes. Each generated symbol may represent one or more bits of data of the digital data.

Serial to parallel converter 206 may take, as an input, symbols from modulator 204 and mix one or more symbols with one or more subcarriers (i.e. subcarrier frequencies) by modifying the amplitude and phase of the subcarrier. For SC-FDMA (i.e., DFT-Spread OFDM), this process may be realized by use of DFT. Each subcarrier may be a waveform at a different frequency. For example, there may be four subcarriers, each operating at a different frequency (e.g., 0 kHz, 15 kHz, 30 kHz, and 45 kHz). By modifying a subcarrier with one or more symbols, a representation of the digital data received from FEC encoder 202 may be encoded into a subcarrier as a function of frequency.

IFFT 208 may take as inputs, the modified subcarriers produced by serial to parallel converter 206 and perform inverse fast Fourier transformations on the inputs to convert the inputs from the frequency domain to the time domain. IFFT 208 may receive N inputs and output N waveforms (i.e. N samples). N may be a variable that represents a number of subcarriers. For example, if N is equal to 20 then IFFT 208 may accept 20 inputs and there are 20 total subcarriers. In one embodiment, not all subcarriers may be utilized to transmit data. In such an embodiment, one or more subcarriers may be utilized for channel estimation/equalization and/or guard bands. The N waveforms output from IFFT 208 may be sinusoidal waveforms. The N waveforms may represent the received modified subcarriers within the time domain.

Parallel to serial converter 210 may receive, as inputs, the N waveforms from IFFT 208 and combine the waveforms into a single waveform. In one embodiment, a parallel to serial conversion may be done, at least in part, by adding the N waveforms (each with different frequencies) together to get a single waveform. This single waveform may be referred to as an OFDM symbol, OFDM signal, OFDM symbol waveform, OFDM waveform, and the like.

Cyclic prefix 212 may receive, as an input, an OFDM symbol from parallel to serial converter 210 and may prepend a cyclic prefix to the OFDM symbol. The cyclic prefix may be a portion of the end of the OFDM symbol. For example, a cyclic prefix may be the last eighth, sixth, fourth, tenth, and the like portion of the OFDM symbol. Once the cyclic prefix is determined it is prepended to the OFDM symbol. The cyclic prefix may be determined based on an underlying OFDM-based communication system and a delay period for a channel of communication between a transmitter and receiver. For example, in one iteration of LTE a cyclic prefix may comprise 160 samples of an OFDM symbol and the OFDM symbol may have a total length of 2208 samples. Thus, the cyclic prefix is 7.25% of the total OFDM symbol length. The following table (Table 1) illustrates exemplary cyclic prefix sizes compared to OFDM symbol size.

TABLE 1

CP duration of OFDM based waveforms in LTE, NB-IoT, and 5G

| Physical Channels | Formats | # of CP samples in a symbol | Total # of samples in a symbol | Fraction of CP samples in a symbol |
|---|---|---|---|---|
| PUSCH (Physical Uplink Shared Channel) | With normal cyclic prefix (symbol index = 0 in a slot) | 160 | 2208 | 7.25% |
| | With normal cyclic prefix (symbol index = 1, . . . , 6 in a slot) | 144 | 2192 | 6.57% |
| | With extended cyclic prefix | 512 | 2560 | 20.00% |
| NRACH (Narrowband Physical Random Access Channel) | Format 0 | 2048 | 40960 | 5.00% |
| | Format 1 | 8192 | 40960 | 20.00% |

As a result, the cyclic prefix may be used to prevent ISI, but may also increase the size of a OFDM symbol which may in turn reduce the data rate of a transmission of the OFDM symbol.

Digital to analog converter/radio frequency (RF) converter 214 may receive, as an input, the OFDM symbol (with the cyclic prefix) and may convert the OFDM symbol into a RF transmission such that the OFDM symbol may be transmitted over a radio frequency and by a radio frequency receiver.

FIG. 3A discloses an exemplary first block diagram for implementing a first process 300A for implementing a cyclic prefix and half tone offset within a OFDM-based system. At a first time, OFDM symbol 302A includes set of samples 304A. Set of samples 304A may be a portion of OFDM symbol 302A. For example, OFDM symbol 302A may comprise 2048 samples and set of samples 304A may comprise the last 160 symbols. At a second time, which is after the first time, set of samples 304A is duplicated and prepended to OFDM symbol 302A to form cyclic prefix 306A. For example, OFDM symbol 302A may now comprise 2048 samples+160 samples (from prepended cyclic prefix 306A). At a third time, which is after the second time, half tone offset 308 is applied to OFDM symbol 302A (which includes the prepended cyclic prefix 306A). In one embodiment, applying half tone offset 308 to OFDM symbol 302A may comprise a plurality of complex multiplication and addition operations. As a result of applying half tone offset 309 to OFDM symbol 302A, carrier spacing associated with OFDM symbol 302A is shifted to avoid signal distortion. At a fourth time, which is after the third time, as a result of the application of half tone offset 308 to OFDM symbol 302A, shifted OFDM symbol 302B is generated. Shifted OFDM symbol 302B may be a half tone frequency shifted version of OFDM symbol 302A. Shifted OFDM symbol 302B may comprise a prepended shifted cyclic prefix 306B which may be a half tone frequency shifted version of cyclic prefix 306A.

In FIG. 3A, signal distortion is mitigated by the use of the half tone offset and ISI is mitigated by the use of a cyclic prefix. However, the cyclic prefix is prepended to a OFDM symbol prior to the OFDM symbol being shifted by the half tone offset. As a result, the complex mathematical process of applying a half tone offset is performed on a larger OFDM symbol. As a result, first process 300A signal distortion and ISI, but at the cost of more complex processing and slower transmission speed of an OFDM symbol.

FIG. 3B discloses an exemplary second block diagram for implementing a second process 300B for implementing a cyclic prefix and half tone offset within a OFDM-based system. At a first time, OFDM symbol 310A includes set of samples 312A. Set of samples 312A may be a portion of OFDM symbol 310A. For example, OFDM symbol 310A may comprise 2048 samples and set of samples 312A may comprise the last 160 symbols. At a second time, which is after the first time, half tone offset 308 is applied to OFDM symbol 310A. In one embodiment, applying half tone offset 308 to OFDM symbol 310A may comprise a plurality of complex multiplication and addition operations. As a result of applying half tone offset 308 to OFDM symbol 310A, carrier spacing associated with OFDM symbol 310A is shifted to avoid signal distortion. At a third time, which is after the second time, as a result of the application of half tone offset 308 to OFDM symbol 310A, shifted OFDM symbol 310B is generated. Shifted OFDM symbol 310B may be a half tone frequency shifted version of OFDM symbol 310A. Shifted OFDM symbol 310B may comprise a shifted set of samples 312B which may be a half tone frequency shifted version of set of samples 312A. At a fourth time, which is after the third time, inverse function 314 is applied to set of samples 312B to generate cyclic prefix 316. Cyclic prefix 316 is then prepended to shifted OFDM symbol 310B. In one embodiment, inverse function 314 may multiply set of samples 312B by the value −1 to generate cyclic prefix 316.

In FIG. 3B, signal distortion is mitigated by the use of the half tone offset and ISI is mitigated by the use of a cyclic prefix. However, an inverse of a set of samples is prepended to a OFDM symbol after the OFDM symbol has been shifted by the half tone offset. As a result, the complex mathematical process of applying a half tone offset is performed for a smaller OFDM symbol. As a result, second process 300B mitigates signal distortion and ISI, but does not require the complex processing associated with a half tone offset to be applied to a larger OFDM symbol, as required in first process 300A. As a result, second process 300B in comparison to first process 300A, reduces the computational processing (e.g., complexity) utilized to create a OFDM symbol. A reduction in computational processing may also lead to a reduction in power requirements of transceivers within an OFDM-based system, which may increase battery life and low-power usage of transceivers. Furthermore, a reduction in computational processing may lead to less physical devices (e.g., logic gates) within a processing device that is responsible for performing said computational processes.

Computational processing reduction may be identified by the following mathematical formula:

$$\text{Complexitiy reduction (\%)} = \frac{\text{number of CP samples in the symbol}}{\text{Total number of samples in the symbol}} \times 100 = \frac{N_{cp}}{N + N_{cp}} \times 100.$$

$N_{cp}$ may be the number of CP samples in the symbol and N may be the number of samples in the symbol (i.e., sample prior to adding CP).

Furthermore, Table 2 lists the cyclic prefix duration of some physical channels used in the LTE, NB-IoT, and 5G systems and shows exemplary complexity reduction associated with utilizing second process 300B.

TABLE 2

CP duration of OFDM based waveforms in LTE, NB-IoT, and 5G

| Physical Channels | Formats | # of CP samples in a symbol | Total # of samples in a symbol | Fraction of CP samples in a symbol | Complexity Reduction |
|---|---|---|---|---|---|
| PUSCH (Physical Uplink Shared Channel) | With normal cyclic prefix (symbol index = 0 in a slot) | 160 | 2208 | 7.25% | 7.25% |
| | With normal cyclic prefix (symbol index = 0 in a slot) | 144 | 2192 | 6.57% | 6.57% |
| | With normal cyclic prefix (symbol index = 1, . . . , 6 in a slot) | 512 | 2560 | 20.00% | 20.00% |
| | With extended cyclic prefix | | | | |
| NRACH (Narrowband Physical Random Access Channel) | Format 0 | 2048 | 40960 | 5.00% | 5.00% |
| | Format 1 | 8192 | 40960 | 20.00% | 20.00% |

With second process 300B, the complexity reduction can be as high as 20% (in the shown examples within Table 2). The percentage of complexity reduction increases for systems that require a large cyclic prefix duration. A large cyclic prefix duration may occur in wide area communications. For example, terrestrial systems with a cell tower in rural areas or satellite communication systems with a wide-beam where the delay spread across devices in the coverage area is large.

The subsequent sections describe a mathematical derivation of second process 300B. First, the mathematics of prepending a cyclic prefix to an OFDM symbol without half tone shift are explained. Second, the mathematics of prepending a cyclic prefix to an OFDM symbol with half tone shift are explained. Third, the relationship between samples (e.g., samples output from an IFFT) with and without half shift are compared for minimizing cyclic prefix complexity.

Notations x(k): input samples to the N-point IFFT. These samples represent modulated symbols in frequency domain.

y(n): output of the N-point IFFT. These samples represent multiplexed subcarriers in time domain.

$\bar{y}$(n): half tone frequency shifted samples of y(n) in time domain.

OFDM Signal with No Half Tone Shift

A transmitter converts the frequency domain samples, x(k), using N-point IFFT (N being the number of subcarriers), as:

$$y(n) = \sum_k x(k)\exp\left\{j2\pi\frac{k}{N}n\right\}, n = 0, \ldots, N-1 \quad (1)$$

and constructs the OFDM symbol by adding last $N_{CP}$ samples in the beginning such that the transmit samples in the symbol are $$[y(N-N_{CP}), \ldots, y(N-1), y(0), y(1), \ldots, y(N-1)] \quad (2)$$

Due to the circular property of the IFFT, y(n) is modular in N. i.e., y(−1)=y(N−1) and y(N+1)=y(1).

If we enumerate (1) over n beyond N, we obtain the following sequence:

$$y(0), \ldots y(N-1), y(N), \ldots y(2N-1), y(2N), \ldots y(3N-1), \ldots \quad (3)$$

Again, due to the circular property, the above sequence is same as:

$$y(0), \ldots y(N-1), y(0), \ldots y(N-1), y(0), \ldots y(N-1), \ldots \quad (4)$$

OFDM Signal with the Half Tone Shift

In the presence of half tone shift, (1) should be modified as:

$$\bar{y}(n) = \sum_k x(k) \exp\left\{2\pi j \frac{k+0.5}{N} n\right\}, n = 0, \ldots, N-1 \quad (5)$$

The half tone shift (i.e.

$$\exp\left(j2\pi \frac{0.5}{N} n\right)$$

introduces a time varying phase as noted in the last term of the following equation:

$$\bar{y}(n) = \left[\sum_k x(k) \exp\left\{j2\pi \frac{k}{N} n\right\}\right] \exp\left(j2\pi \frac{0.5}{N} n\right), \quad (6)$$
$$n = 0, \ldots, N-1$$

Noting that the term in the bracket in (6) is the same as y(n) in (1), we can rewrite (6) as:

$$\bar{y}(n) = y(n) \cdot \exp\left(j2\pi \frac{0.5}{N} n\right), n = 0, \ldots, N-1 \quad (7)$$

However, due to the time varying phase term, $$\exp\left(j2\pi \frac{0.5}{N} n\right)$$

the circular property in $\bar{y}(n)$ is not the same as that of y(n). For example, $\bar{y}(N) \neq \bar{y}(2N)$ as shown below:

$$\bar{y}(N) = y(N) \cdot \exp(j\pi) = y(0) \cdot \exp(j\pi) = \bar{y}(0) \cdot \exp(j\pi) = -\bar{y}(0) \quad (8)$$

$$\bar{y}(N+1) = y(N+1) \cdot \exp\left(j\pi\left(1+\frac{1}{N}\right)\right) = y(1) \cdot \exp\left(j\pi\frac{1}{N}\right)\exp(j\pi) =$$
$$\bar{y}(1) \cdot \exp(j\pi) = -\bar{y}(1)$$
$$\vdots$$
$$\bar{y}(2N) = y(2N) \cdot \exp(j2\pi) = y(0) \cdot \exp(j2\pi) = \bar{y}(0)$$

$$\bar{y}(2N+1) = y(2N+1) \cdot \exp\left(j\pi\left(2+\frac{1}{N}\right)\right) = y(1) \cdot \exp\left(j\pi\frac{1}{N}\right) = \bar{y}(1)$$

Similar to (3), if we enumerate (5) over n beyond N, we obtain the following sequence:

$$\bar{y}(0), \ldots \bar{y}(N-1), \bar{y}(N), \ldots \bar{y}(2N-1), \bar{y}(2N), \ldots$$
$$\bar{y}(3N-1), \ldots \quad (9)$$

The Relationship Between the CP Prepended OFDM Samples with and without Half Tone Offset Due to the difference in circular property as described in (8), the sequence in (9) is now:

$$\bar{y}(0), \ldots \bar{y}(N-1), -\bar{y}(0), \ldots, -\bar{y}(N-1), \bar{y}(0), \ldots,$$
$$\bar{y}(N-1) \quad (10)$$

which is different from the following sequence which has a modular period of N.

$$\bar{y}(0), \ldots \bar{y}(N-1), \bar{y}(0), \ldots \bar{y}(N-1), \bar{y}(0), \ldots \bar{y}(N-1) \quad (11)$$

Thus the CP portion includes the sign inverted samples of the last $N_{CP}$ samples at the beginning and (2) should be modified as follows when the half tone frequency shift is introduced $$[-\bar{y}(N-N_{CP}), \ldots, -\bar{y}(N-1), \bar{y}(0), \bar{y}(1), \ldots \bar{y}(N-1)] \quad (12)$$

The simple mathematical expression shown in (12) enables low complexity implementation of center frequency shift, eliminating the need for complex multiplication over CP samples involved in the half tone frequency shift. The realization of efficient implementation (e.g., reduction in complexity) has been previously described, above, in Table 2.

Figure 4A:
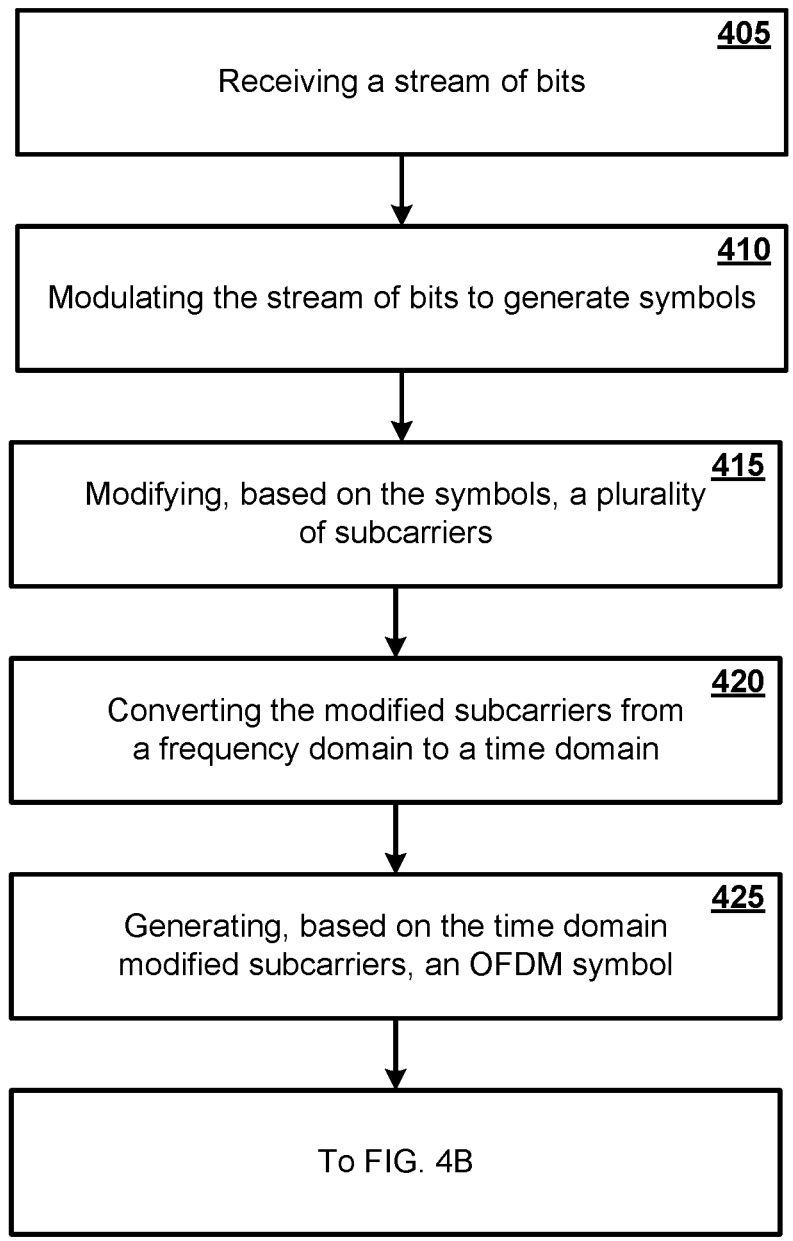
FIG. 4A depicts an example process for efficient cyclic prefix generation in accordance with one or more embodiments.
Figure 4B:
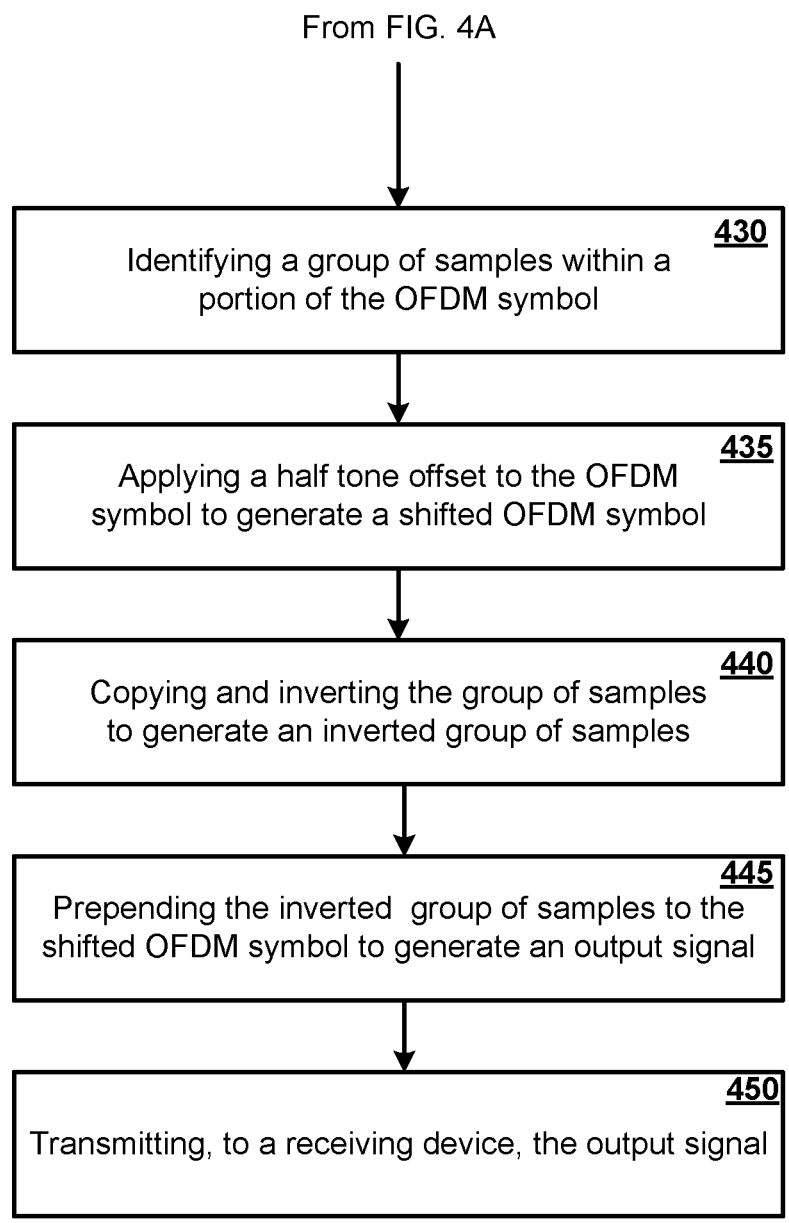
FIG. 4B depicts an example process for efficient cyclic prefix generation in accordance with one or more embodiments.

FIGS. 4A-4B illustrate simplified process 400 for efficient cyclic prefix generation with half tone offset. One or more aspects of process 400 may be performed by a transmission device. A transmission device may be a device capable of transmitting radio frequency communications or digital communications to receiving devices over a network. At 405, a transmission device receives a stream of bits. The stream of bits may be received from one or more data sources, such as a content provider, a sensor, a mobile device, and the like.

At 410, the transmission device modulates the stream of bits to generate symbols representative of the stream of bits. The modulation may be a process for converting digital data into symbols using one or more modulation schemes, such as, quadrature phase shift keying (QPSK), quadrature amplitude modulator (QAM), binary phase shift keying (BPSK), and the like, and/or any combination of one or more modulation schemes. Each generated symbol may represent one or more bits of data of the stream of bits.

At 415, the transmission device modifies, based on the generated symbols, a plurality of subcarriers. A subcarrier may be modified by altering the amplitude and/or phase of the subcarrier. Each subcarrier may be a waveform operating at a different frequency. By modifying a subcarrier with one or more symbols, a representation of the stream of bits received at 405 may be encoded into a subcarrier as a function of frequency. For SC-FDMA (i.e., DFT-Spread OFDM), this process may be realized by use of DFT.

At 420, the transmission device coverts the modified subcarriers from a frequency domain to a time domain. The transmission device may implement an IFFT that takes as input the modified subcarriers and performs an inverse fast Fourier transformation on the subcarriers to convert the subcarriers to the time domain. The output of the IFFT may be a corresponding waveform (in the time domain) for each modified subcarrier. Each waveform may be referred to as a sample.

At 425, the transmission device generates, based on IFFT produced waveforms (time domain modified subcarriers), an OFDM symbol. In one embodiment the produced waveforms at 420 may be summed together to form a single waveform and this single waveform may be the OFDM symbol. Thus, the OFDM symbol can be a single waveform that contains all samples generated by the IFFT at 420 and the OFDM symbol may further indicate a plurality of encoded data within multiple subcarriers.

At 430, the transmission device identifies a group of samples within a portion of the OFDM symbol. The group of samples may be an end portion of samples of the OFDM symbol. In one embodiment, the length of the group of samples is equal or greater than the length of a delay period for a channel of communication between the transmission device and a receiving device. In one embodiment, the group of samples may comprise the last $\frac{1}{16}$ of the samples of an OFDM symbol, the last $\frac{1}{8}$ samples of an OFDM symbol, the last $\frac{1}{4}$ of the samples of the OFDM symbol, the last $\frac{78}{1000}$ of the samples of the OFDM symbol, and the like. In one embodiment, the term "last" may mean last a function of time, such the last portion of OFDM symbol refers to a portion of the OFDM that occurs last in time.

At 435, the transmission device applies a half tone offset to the OFDM symbol to generate a shifted OFDM symbol. A half tone offset may shift the center frequency of the OFDM symbol so that the OFDM symbol is not centered on the center subcarrier (i.e. 0 Hz subcarrier). Because the center frequency of the OFDM symbol is shifted each subcarrier within represented within the OFDM symbol is also shifted. In one embodiment, the half tone offset shifts the OFDM symbol by half a carrier spacing. For example, in LTE, subcarrier spacing is 15 kHz. In such an example, the OFDM symbol would be shifted by 7.5 kHz. As a result the center subcarrier would be 7.5 kHz as opposed to 0 Hz.

At 440, the transmission device copies and inverts the group of samples to generate an inverted group of samples. Inverting the group of samples may comprise multiplying the group of samples by negative 1 (i.e. inverting the sign of the group of samples). The inverted group of samples may be referred to as a cyclic prefix.

At 445, the transmission device prepends the inverted group of samples to the shifted OFDM symbol to generate an output symbol. The inverted group of samples is concatenated to the front of the OFDM symbol as a guard band to protect the OFDM symbol from ISI with other OFDM symbols.

At 450, the transmission device transits, to a receiving device, the output signal. The transmission device may transmit, via a radio frequency, the output signal to a receiving device. In one embodiment, at least 435, 440, and 445 are performed in sequential order such that a half tone offset is applied to an OFDM symbol prior to a cyclic prefix being prepended to the OFDM symbol. Furthermore, process 400 may be repeated for multiple OFDM symbols. In one embodiment, a plurality of output signals may be concatenated and transmitted as a burst.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying", "modifying", "prepending", "concatenating", "converting", "inverting" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art. Indeed, the methods and systems described herein may be embodied in a variety of other forms; furthermore, various omissions, substitutions and changes in the form of the methods and systems described herein may be made without departing from the spirit of the present disclosure. The accompanying claims and their equivalents are intended to cover such forms or modifications as would fall within the scope and spirit of the present disclosure.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another, or may be combined in various ways. All possible combinations and sub-combinations are intended to fall within the scope of the present disclosure. In addition, certain method or process blocks may be omitted in some embodiments. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

What is claimed is:

1. A cyclic prefix generation method for wireless communication comprising:
   receiving a symbol waveform associated with one or more subcarriers, where each subcarrier of the one or more subcarriers is associated with a first frequency;
   identifying a last portion of the symbol waveform;
   modifying, by applying a half tone offset, a second frequency associated with the symbol waveform to generate a frequency shifted symbol waveform;
   in response to generating the frequency shifted symbol waveform, inverting a sign of the last portion of the symbol waveform to generate an inverted portion;
   prepending the inverted portion to the frequency shifted symbol waveform to generate an output signal; and
   transmitting, to a receiving device, the output signal.

2. The cyclic prefix generation method for wireless communication of claim 1, further comprising generating, based at least in part on an Inverse Fast Fourier Transform, the symbol waveform.

3. The cyclic prefix generation method for wireless communication of claim 1, wherein the second frequency is a center frequency of the symbol waveform.

4. The cyclic prefix generation method for wireless communication of claim 1, wherein the symbol waveform comprises a sample length of x and the last portion comprises a sample length of y, wherein x is a positive integer and y is a positive integer that is less than x.

5. The cyclic prefix generation method for wireless communication of claim 1, wherein the output signal comprises a sample length of x and the inverted portion comprises a sample length y, wherein the inverted portion is prepended to a sample portion length of x and x is a positive integer and y is a positive integer that is less than x.

6. The cyclic prefix generation method for wireless communication of claim 1, wherein the symbol waveform is an orthogonal frequency division multiplexing symbol waveform or a single carrier frequency divisional multiple access symbol waveform.

7. The cyclic prefix generation method for wireless communication of claim 1, wherein the receiving device is a sensor within a narrow band Internet of Things system.

8. A non-transitory computer-readable storage medium having stored thereon instructions for causing at least one computer system to efficiently generate a cyclic prefix for wireless communication, the instructions comprising:
   receiving a symbol waveform associated with one or more subcarriers, where each subcarrier of the one or more subcarriers is associated with a first frequency;
   identifying a last portion of the symbol waveform;
   modifying, by applying a half tone offset, a second frequency associated with the symbol waveform to generate a frequency shifted symbol waveform;
   in response to generating the frequency shifted symbol waveform, inverting a sign of the last portion of the symbol waveform to generate an inverted portion;
   prepending the inverted portion to the frequency shifted symbol waveform to generate an output signal; and
   transmitting, to a receiving device, the output signal.

9. The computer-readable storage medium of claim 8, the instructions further comprising generating, based at least in part on an Inverse Fast Fourier Transform, the symbol waveform.

10. The computer-readable storage medium of claim 8, wherein the second frequency is a center frequency of the symbol waveform.

11. The computer-readable storage medium of claim 8, wherein the symbol waveform comprises a sample length of x and the last portion comprises a sample length of y, wherein x is a positive integer and y is a positive integer that is less than x.

12. The computer-readable storage medium of claim 8, wherein the output signal comprises a sample length of x and the inverted portion comprises a sample lengthy, wherein the inverted portion is prepended to a sample portion length of x and x is a positive integer and y is a positive integer that is less than x.

13. The computer-readable storage medium of claim 8, wherein the symbol waveform is an orthogonal frequency division multiplexing symbol waveform or a single carrier frequency divisional multiple access symbol waveform.

14. The computer-readable storage medium of claim 8, wherein the receiving device is a sensor within a narrow band Internet of Things system.

15. A system for efficiently generating a cyclic prefix for wireless communication, comprising:
   one or more processors; and
   a memory coupled with the one or more processors, the memory configured to store instructions that when executed by the one or more processors cause the one or more processors to:
   receive a symbol waveform associated with one or more subcarriers, where each subcarrier of the one or more subcarriers is associated with a first frequency;
   identify a last portion of the symbol waveform;
   modify, by applying a half tone offset, a second frequency associated with the symbol waveform to generate a frequency shifted symbol waveform;
   in response to generating the frequency shifted symbol waveform, invert a sign of the last portion of the symbol waveform to generate an inverted portion;
   prepend the inverted portion to the frequency shifted symbol waveform to generate an output signal; and
   transmit, to a receiving device, the output signal.

16. The system of claim 15, wherein the instructions that when executed by the one or more processors further cause the one or more processors to generate, based at least in part on an Inverse Fast Fourier Transform, the symbol waveform.

17. The system of claim 15, wherein the second frequency is a center frequency of the symbol waveform.

18. The system of claim 15, wherein the symbol waveform comprises a sample length of x and the last portion comprises a sample length of less than 25 percent of x, wherein x is greater than or equal to 2048.

19. The system of claim 15, wherein the output signal comprises a sample length of x and the inverted portion comprises a sample length of greater than 7 percent of x, wherein x is greater or equal to 2048.

20. The system of claim 15, wherein the symbol waveform is an orthogonal frequency division multiplexing symbol waveform or a single carrier frequency divisional multiple access symbol waveform.

* * * * *